United States Patent
Lee (10) Patent No.: US 8,994,432 B2
(45) Date of Patent: Mar. 31, 2015

(54) SEMICONDUCTOR INTEGRATED CIRCUIT AND METHOD OF OPERATING THE SAME

(71) Applicant: Samsung Electronics Co., Ltd., Suwon-si (KR)

(72) Inventor: Hoi Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/974,763

(22) Filed: Aug. 23, 2013

(65) Prior Publication Data

US 2014/0152372 A1 Jun. 5, 2014

(30) Foreign Application Priority Data

Nov. 30, 2012 (KR) .................. 10-2012-0138048

(51) Int. Cl.
*H03K 3/017* (2006.01)
*G06F 1/32* (2006.01)

(52) U.S. Cl.
CPC ..................................... *G06F 1/324* (2013.01)
USPC .............. 327/291; 327/99; 327/198; 327/299

(58) Field of Classification Search
USPC ............ 327/99, 198–199, 291, 294, 298–299
See application file for complete search history.

(56) References Cited

U.S. PATENT DOCUMENTS

| | | | |
|---|---|---|---|
| 6,263,448 B1 * | 7/2001 | Tsern et al. | .................. 713/501 |
| 6,546,540 B1 | 4/2003 | Igarashi et al. | |
| 6,653,871 B2 * | 11/2003 | Masuda et al. | .................. 327/99 |
| 7,181,709 B2 | 2/2007 | Tajika et al. | |
| 2008/0030252 A1 | 2/2008 | Cheng et al. | |

FOREIGN PATENT DOCUMENTS

| | | |
|---|---|---|
| KR | 10-2007-0089428 A | 8/2007 |
| KR | 10-2012-0072405 A | 7/2012 |
| KR | 10-2012-0081933 A | 7/2012 |

* cited by examiner

*Primary Examiner* — An Luu
(74) *Attorney, Agent, or Firm* — Sughrue Mion, PLLC (57) ABSTRACT

A semiconductor integrated circuit and a method operating the same are provided. The semiconductor integrated circuit includes a first clock network configured to divide a clock signal into first output clock signals with a high frequency, a second clock network configured to divide the clock signal into second output clock signals with a non-high frequency, a plurality of selection circuits configured to be connected between the first clock network and the second clock network, and configured to output one of the first output clock signals and the second output clock signals, according to a power mode, and a plurality of clock sinks configured to sink output clock signals respectively output from the selection circuits.

17 Claims, 7 Drawing Sheets

SEMICONDUCTOR INTEGRATED CIRCUIT AND METHOD OF OPERATING THE SAME

CROSS-REFERENCE TO RELATED APPLICATIONS

This application claims priority from Korean Patent Application No. 10-2012-0138048, filed on Nov. 30, 2012 in the Korean Intellectual Property Office, the disclosure of which is hereby incorporated by reference in its entirety.

BACKGROUND

Exemplary embodiments relate to a semiconductor integrated circuit. More particularly, exemplary embodiments relate to a semiconductor integrated circuit which reduces power consumption by having a new clock path for transmission of a clock signal, and a method of operating the same.

With the spread of portable devices, such as smart phones and tablet personal computers (PCs), and the increase of applications available in the portable devices, approaches for reducing power consumption of the portable devices is needed. The portable devices of the related art may include many synchronization circuits which operate in synchronization with a clock signal. As an example of the related art, dynamic voltage and frequency scaling (DVFS) is a method for reducing power consumed by synchronization circuits. DVFS is a power-saving technique used in various types of synchronization circuits.

DVFS is a related art technique that increases the voltage and frequency of a portable device when the portable device shows the maximum performance. Further, DVFS in the related art decreases the frequency according to necessary performance for an application of the portable device, and decreases the voltage to a level that can be driven at the decreased frequency, when the maximum performance is not needed. Thus, the power consumption of the portable device in the related art is reduced. According to DVFS in the related art, decreasing the voltage exerts more influence on the reduction of power consumption than decreasing the frequency. However, semiconductor integrated circuits are designed to satisfy maximum performance. As a result, when the portable device of the related art does not require the maximum performance, a clock network for high-end products designed for the maximum performance will require greater power consumption than the performance needs.

SUMMARY

According to an aspect of the exemplary embodiments, a method of operating a semiconductor integrated circuit may be provided. The method may include dividing a clock signal into first output clock signals with a high frequency, dividing the clock signal into second output clock signal with a non-high frequency, and selecting and sinking one of the first output clock signals and the second output clock signals, according to a power mode.

The first output clock signals may be generated by driving the clock signal to a first clock network configured in mesh structure.

The second output clock signals may be generated by driving the clock signal to a second clock network configured in mesh structure with less density than the mesh structure of the first clock network.

The power mode may include a maximum performance mode and a non-maximum performance mode. The first output clock signals may be selected and sunk in the maximum performance mode and the second output clock signals may be selected and sunk in the non-maximum performance mode.

According to another aspect of the exemplary embodiments, there is provided a semiconductor integrated circuit including a first clock network configured to divide a clock signal into first output clock signals with a high frequency, a second clock network configured to divide the clock signal into second output clock signal with a non-high frequency, a plurality of selection circuits configured to be connected between the first clock network and the second clock network, and configured to select and output one of the first output clock signals and the second output clock signals, according to a power mode, and a plurality of clock sinks configured to sink output clock signals respectively output from the selection circuits.

The first clock network may be configured in a mesh structure, and the second clock network may be configured in mesh structure with less density than the mesh structure of the first clock network.

Alternatively, the first clock network may be configured in a mesh structure, and the second clock network may be configured in a tree structure with less density than the mesh structure of the first clock network.

Each of the selection circuits maybe a NOR gate circuit configured to receive one of the first output clock signals and one of the second output clock signals, and one of the first clock network and the second clock network, which is not selected according to the power mode, may be fixed to a ground voltage.

Alternatively, each of the selection circuits may be a NAND gate circuit configured to receive one of the first output clock signals and one of the second output clock signals, and one of the first clock network and the second clock network, which is not selected according to the power mode, may be fixed to a supply voltage.

Each of the clock sinks may be a flip-flop configured to output a data signal in response to the respective output clock signal output from a respective selection circuit.

The semiconductor integrated circuit may further include a power mode detector configured to monitor the power mode of the semiconductor integrated circuit, and configured to output a selection signal. At this time, each of the selection circuits may be a multiplexer configured to output one of the first output clock signals and the second output clock signals, according to the selection signal.

The first clock network and the second clock network may be positioned on different layers, or on a same layer.

The selection circuits may select the first clock network when the power mode is a maximum performance mode, and select the second clock network when the power mode is a non-maximum performance mode.

According to another aspect of the exemplary embodiments, there is provided a semiconductor integrated circuit including a first clock network configured in a mesh structure to generate first output clock signals, a second clock network configured in a tree structure to generate second output clock signals, a plurality of selection circuits configured to receive the first output clock signals and the second output clock signals, each of the selection circuits is configured to select and output one of the first output clock signals or one of the second output clock signals, according to a power mode; and a plurality of clock sinks configured to receive the one of the first output clock signals or one of the second output clock signals from respective selection circuits, each of the clock sinks is configured to sink the one of the first output clock signals or one of the second output signals output from a respective selection circuit. The plurality of selection circuits are further configured to be connected between the first clock network and the second clock network.

BRIEF DESCRIPTION OF THE DRAWINGS

The above and other features and advantages of the exemplary embodiments will become more apparent by describing in detail exemplary embodiments thereof with reference to the attached drawings, in which.

DETAILED DESCRIPTION OF THE EXEMPLARY EMBODIMENTS

The exemplary embodiments will be described more fully hereinafter with reference to the accompanying drawings, in which embodiments are shown. The exemplary embodiments may, however, be embodied in many different forms, and should not be construed as limited to the embodiments set forth herein. Rather, these embodiments are provided so that this disclosure will be thorough and complete, and will fully convey the scope of the exemplary embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only, and is not intended to be limiting of the exemplary embodiments. As used herein, the singular forms "a", "an", and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
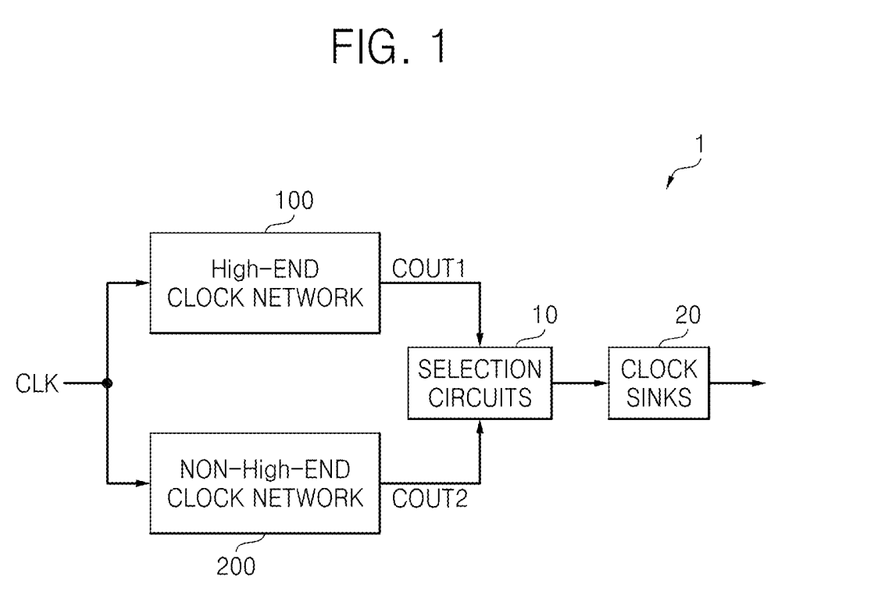
FIG. 1 is a block diagram of a semiconductor integrated circuit including a clock network according to some embodiments.

FIG. 1 is a block diagram of a semiconductor integrated circuit 1 including a clock network according to some embodiments. The semiconductor integrated circuit 1 includes a high-end clock network 100, a non-high-end clock network 200, a plurality of selection circuits 10, and a plurality of clock sinks 20. A clock signal CLK, which has been output and buffered by a clock source, e.g., a phase locked loop (PLL) or a delay locked loop (DLL), is input to the semiconductor integrated circuit 1, i.e., the high-end clock network 100 and the non-high-end clock network 200.

The high-end clock network 100 may divide the clock signal CLK into first output clock signals COUT1 with a high frequency. The high-end clock network 100 transmits the clock signal CLK to a plurality of branches. The high-end clock network 100 may be referred to as a first clock network.

The high-end clock network 100 may be implemented as a clock tree, including a plurality of tree branches. Each tree branch is a clock path through which the clock signal CLK is transmitted to a destination, i.e., an intellectual property (IP) connected to an end of the branch. The selection circuits 10 may be connected with the tree branches, respectively.

Alternatively, the high-end clock network 100 may be implemented in a mesh structure, i.e., it may have a plurality of mesh branches. The selection circuits 10 may be respectively connected with the mesh branches, which transmit the clock signal CLK.

The non-high-end clock network 200 may divide the clock signal CLK into second output clock signals COUT2 with a non-high frequency. The non-high-end clock network 200 may be referred to as a second clock network since it divides the clock signal CLK into signals with a low frequency or a medium frequency.

The non-high-end clock network 200 may be implemented as a clock tree, including a plurality of tree branches. Each tree branch is a clock path through which the clock signal CLK is transmitted to a destination, i.e., an IP connected to an end of the branch. The selection circuits 10 may be connected with the tree branches, respectively.

Alternatively, the non-high-end clock network 200 may be implemented in a mesh structure, i.e., it may have a plurality of mesh branches. The selection circuits 10 may be connected with the mesh branches, respectively, which transmit the clock signal CLK.

The high-end clock network 100 and the non-high-end clock network 200 may be positioned on the same layer or different layers, respectively.

The selection circuits 10 are connected between the high-end clock network 100 and the non-high-end clock network 200. Each of the selection circuits 10 selects and outputs either a first output clock signal COUT1 or a second output clock signal COUT2, according to a power mode of the semiconductor integrated circuit 1. Each of the selection circuits 10 may be implemented as a logic circuit, which selects either of the first and second output clock signals COUT1 and COUT2. The logic circuit may be a multiplexer, a NAND circuit, or a NOR circuit.

The power mode includes a maximum performance mode and a non-maximum performance mode. The selection circuits 10 may select the maximum performance mode for an application expected to consume a lot of power for applications executed in the semiconductor integrated circuit 1, and output the first output clock signal COUT1. For an application requiring less power consumption, the selection circuit 10 may select the non-maximum performance mode, and output the second output clock signal COUT2.

The clock sinks 20 are respectively connected with the selection circuits 10. Each of the clock sinks 20 generate and sink a pulse using an output clock signal COUT, selected and output by a corresponding selection circuit 10. The output clock signal COUT, which has been sunk, is transmitted to other elements (e.g., IPs) of the semiconductor integrated circuit 1.

The clock sink 20 may be implemented as a sequential logic circuit, which operates in response to the output clock signal COUT. The sequential logic circuit may be implemented by a register, a latch, or a flip-flop.

The semiconductor integrated circuit 1 may also include a power mode detector (not shown), which monitors the power mode of the semiconductor integrated circuit 1 and outputs a selection signal. Each of the selection circuits 10 may be implemented as a multiplexer, which outputs one of the first and second output clock signals COUT1 and COUT2 in response to the selection signal output from the power mode detector.

Figure 2:
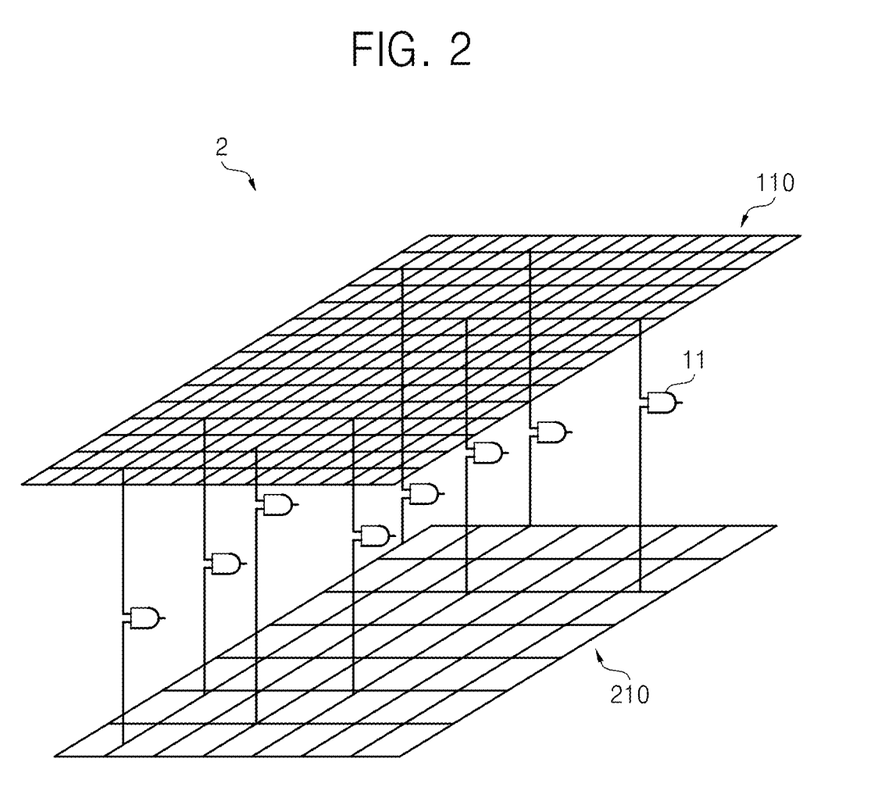
FIG. 2 is a diagram of the clock network illustrated in FIG. 1, which has mesh-mesh topology, according to some embodiments.

FIG. 2 is a diagram of the clock network illustrated in FIG. 1, which has mesh-mesh topology, according to some embodiments. The high-end clock network 100 illustrated in FIG. 1 may be implemented by a high-end clock network 110 in a mesh structure in a semiconductor integrated circuit 2, as shown in FIG. 2. In other words, the high-end clock network 110 implemented in the mesh structure, receives and divides the clock signal CLK into the first output clock signals COUT1, and the first output clock signals COUT1 are respectively output through selection circuits 11 to the clock sinks 20, respectively.

The non-high-end clock network 200 illustrated in FIG. 1 may be implemented by a non-high-end clock network 210 in a mesh structure shown in the semiconductor integrated circuit 2 illustrated in FIG. 2. In other words, the non-high-end clock network 210 implemented in the mesh structure receives and divides the clock signal CLK into the second output clock signals COUT2 and the second output clock signals COUT2 are output through selection circuits 11, respectively, to the clock sinks 20, respectively.

The non-high-end clock network 210 has a lower density than the high-end clock network 110. In other words, the mesh structure of the non-high-end clock network 210 is less dense than that of the high-end clock network 110. Therefore, a second output clock signal COUT2, with a lower frequency (a low or medium frequency), than a first output clock signal COUT1, with a high frequency, is generated from each of the branches of the non-high-end clock network 210.

Each of the selection circuits 11 is connected between a branch of the high-end clock network 110 and a branch of the non-high-end clock network 210, and outputs either the first output clock signal COUT1 or the second output clock signal COUT2. When each selection circuit 11 is implemented by a NAND circuit, the high-end clock network 110 or the non-high-end clock network 210, which is not selected, is fixed to a supply voltage. When each selection circuit 11 is implemented by a NOR circuit, the high-end clock network 110 or the non-high end clock network 210, which is not selected, is fixed to a ground voltage. Although not shown, one of the clock sinks 20 is connected to each of the selection circuits 11 to sink the selected output clock signal COUT1 or COUT2.

Figure 3:
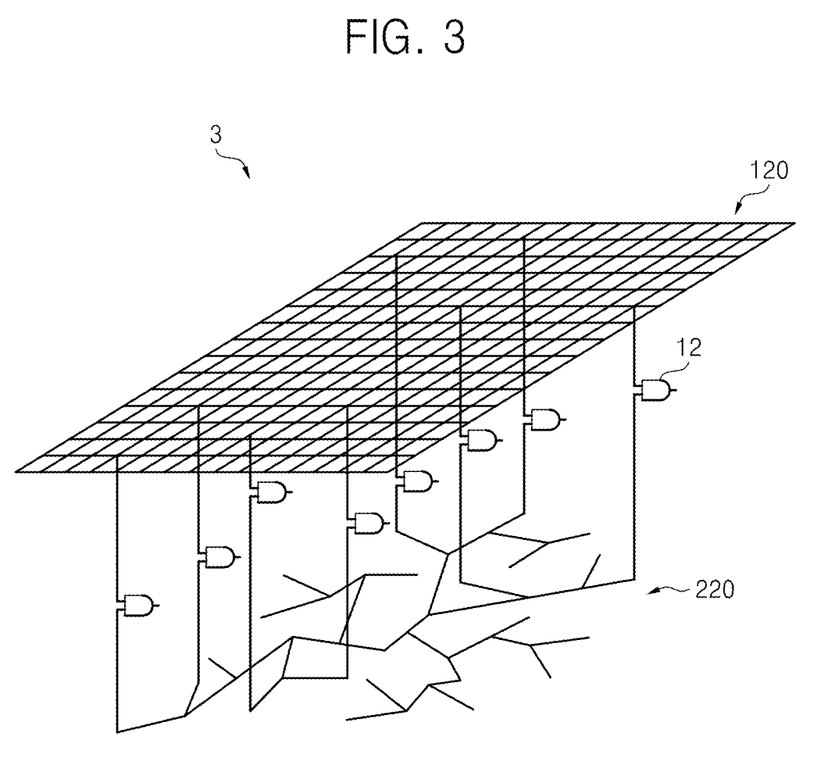
FIG. 3 is a diagram of the clock network illustrated in FIG. 1, which has mesh-tree topology, according to other embodiments

FIG. 3 is a diagram of the clock network illustrated in FIG. 1, which has mesh-tree topology, according to other embodiments. The high-end clock network 100 illustrated in FIG. 1 may be implemented by a high-end clock network 120 in a mesh structure in a semiconductor integrated circuit 3, as shown in FIG. 3.

The non-high-end clock network 200 illustrated in FIG. 1 may be implemented by a non-high-end clock network 220 in a tree structure in the semiconductor integrated circuit 3, as shown in FIG. 3. In other words, the non-high-end clock network 220 implemented in the tree structure, including a plurality of tree branches, receives and divides the clock signal CLK into the second output clock signals COUT2, and the second output clock signals COUT2 are respectively output through selection circuits 12, to the clock sinks 20, respectively.

The non-high-end clock network 220 has a lower density than the high-end clock network 120. Each branch of the non-high-end clock network 220 generates a second output clock signal COUT2, with a lower frequency (a low or medium frequency) than a first output clock signal COUT1, with a high frequency.

Each of the selection circuits 12 is connected between a branch of the high-end clock network 120 and a branch of the non-high-end clock network 220 and outputs either the first output clock signal COUT1 or the second output clock signal COUT2. When each of the selection circuits 12 is implemented by a NAND circuit, the clock network 120 or 220, which is not selected, is fixed to a supply voltage. When each selection circuit 12 is implemented by a NOR circuit, the clock network 120 or 220, which is not selected, is fixed to a ground voltage. Although not shown, one of the clock sinks 20 is connected to each of the selection circuits 12 to sink the selected output clock signal COUT1 or COUT2.

Figure 4:
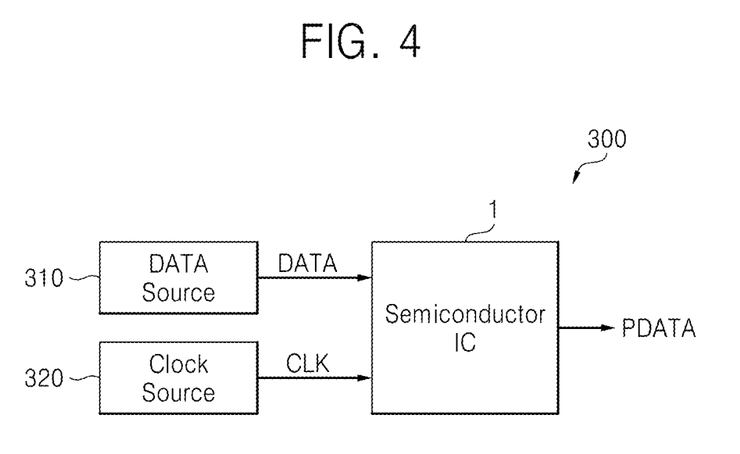
FIG. 4 is a schematic block diagram of a data processing device including the semiconductor integrated circuit illustrated in FIG. 1 according to some embodiments.

FIG. 4 is a schematic block diagram of a data processing device 300, including the semiconductor integrated circuit (IC) 1 illustrated in FIG. 1, according to some embodiments. Referring to FIGS. 1 and 4, the data processing device 300 includes the semiconductor IC 1, a data source 310, and a clock source 320.

The data processing device 300 may be any device including a sequential logic circuit that can process data DATA output from the data source 310, in response to the clock signal CLK. The data processing device 300 may be a system on chip (SOC), a processor, a central processing unit (CPU), a personal computer (PC), a data server, or a portable device.

The portable device may be implemented by a handheld device, such as a laptop computer, a mobile phone, smart phone, a tablet PC, a personal digital assistant (PDA), an enterprise digital assistant (EDA), a digital still camera, a digital video camera, a portable multimedia player (PMP), a personal navigation device or portable navigation device (PND), a car navigation system, a handheld game console, or an e-book.

The semiconductor IC 1 sends the clock signal CLK output from the clock source 320, or a clock signal buffered by a buffer, to tree branches of the clock networks 100 and 200. The clock signal CLK may be divided into the first output clock signals COUT1 with a high frequency. In other words, the first output clock signals COUT1 may be generated by driving the clock signal CLK to the high-end clock network 100.

The clock signal CLK may also be divided into the second output clock signals COUT2 with a non-high frequency (a low or medium frequency). In other words, the second output clock signals COUT2 may be generated by driving the clock signal to the non-high-end clock network 200.

The first and second clock networks 100 and 200 include a plurality of branches, which may be implemented in a mesh or tree structure. The non-high-end clock network 200 is implemented such that the non-high-end clock network 200 has less density than the high-end clock network 100. Therefore, the second output clock signals COUT2 have a lower frequency than the first output clock signals COUT1.

The semiconductor IC 1 selects one of output clock signals COUT, i.e., a first output clock signal COUT1 and a second output clock signal COUT2 output from respective tree branches, and sinks the selected output clock signal COUT1 or COUT2 according to a power mode. For an application requiring high power consumption for applications executed in the semiconductor IC 1, the first output clock signal COUT1 may be selected and sunk. For an application requiring low power consumption, the second output clock signal COUT2 may be selected, and sunk. The semiconductor IC 1 processes the data DATA output from the data source 310 in response to the output clock signal COUT1 or COUT2, which has been sunk, and outputs processed data PDATA.

As has been described with reference to FIGS. 1 through 3, at least one of the clock networks 100 and 200 may be implemented in a tree or mesh structure.

Figure 5:
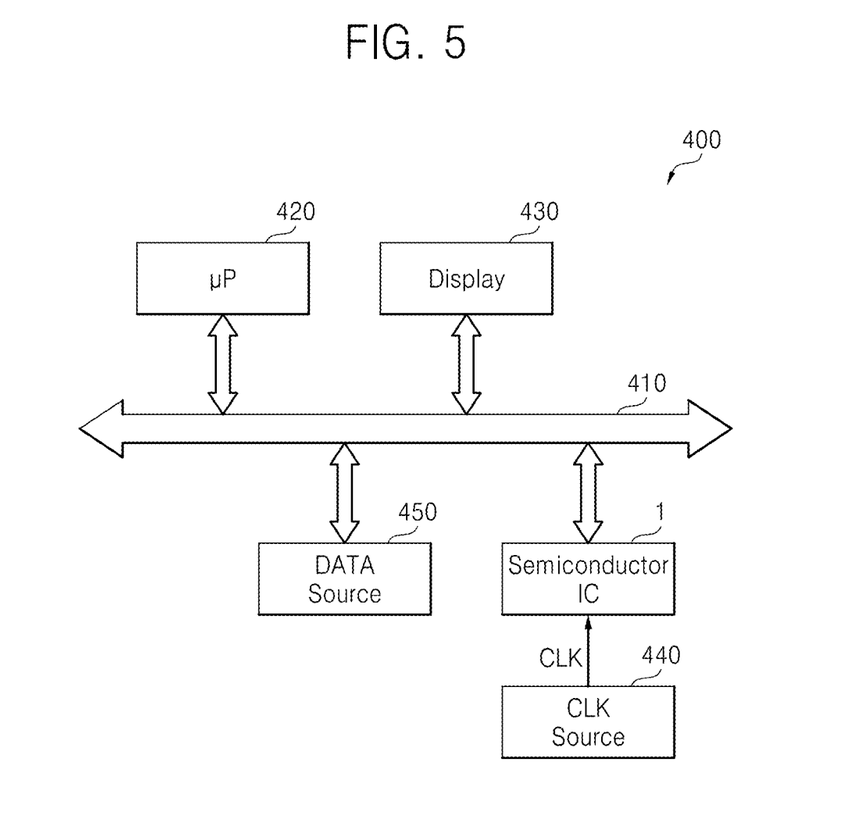
FIG. 5 is a schematic block diagram of a data processing device including the semiconductor integrated circuit illustrated in FIG. 1 according to other embodiments.

FIG. 5 is a schematic block diagram of a data processing device 400 including the semiconductor IC 1 illustrated in FIG. 1, according to other embodiments. Referring to FIG. 5, the data processing device 400 includes the semiconductor IC 1, a microprocessor 420, a display 430, and a data source 450, which communicate with each another through a bus 410. The data source 450 may be an embedded memory, or an external memory. The data processing device 400 also includes a clock source 440 generating a clock signal CLK. As described above, the data processing device 400 may be implemented as a PC, a data server, or a portable device.

The clock source 440, illustrated in FIG. 5, performs the same function as the clock source 320, illustrated in FIG. 4. The data source 450, illustrated in FIG. 5, performs the same function as the data source 310, illustrated in FIG. 4.

As described above, clock networks implemented in the semiconductor IC 1 according to some embodiments are selectively used, according to the expected power consumption of an application. Therefore, power consumption of the semiconductor IC 1 can be significantly reduced.

Figure 6:
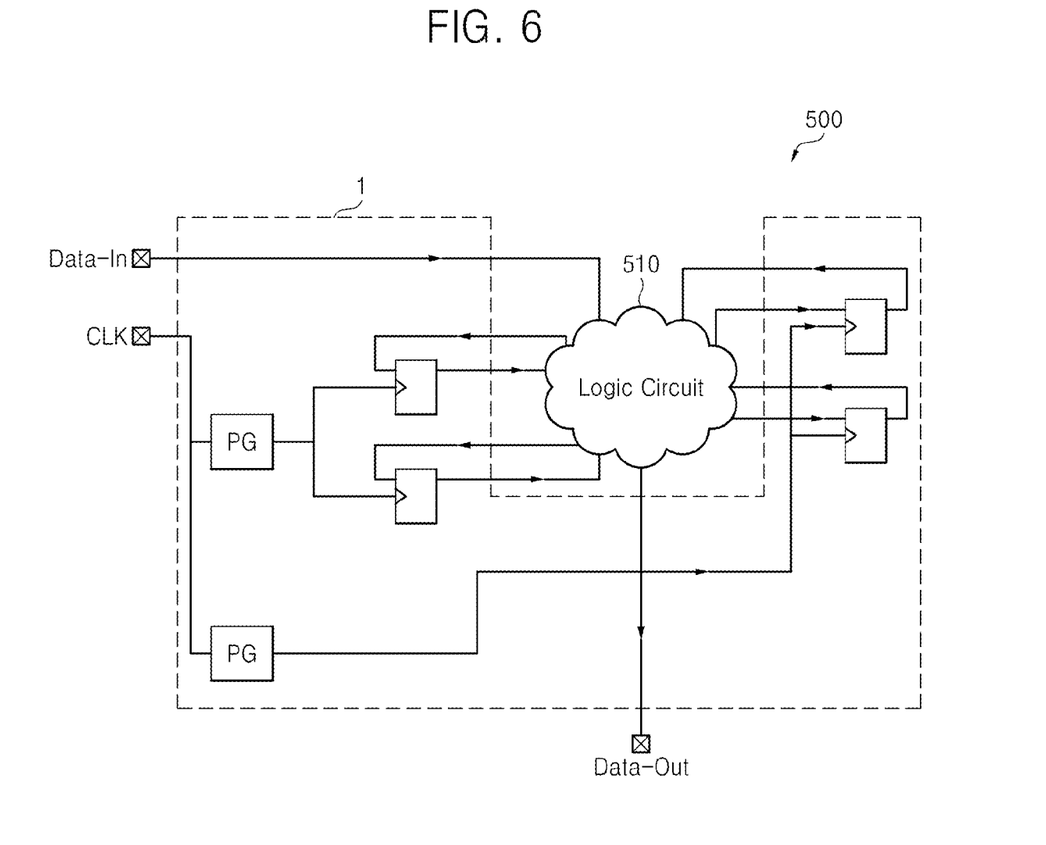
FIG. 6 is a schematic block diagram of a data processing device including the semiconductor integrated circuit illustrated in FIG. 1 according to further embodiments.

FIG. 6 is a schematic block diagram of a data processing device 500, including the semiconductor IC 1 illustrated in FIG. 1, according to further embodiments. Referring to FIGS. 1 and 6, the data processing device 500 may be implemented as a single IC, or a single SOC. The data processing device 500 includes the semiconductor IC 1 and a logic circuit 510. The logic circuit 510 may be implemented by volatile or non-volatile memory.

A clock sink, implemented in the semiconductor IC 1, may communicate data with the logic circuit 510. For instance, input data Data-In is processed by the semiconductor IC 1 and the logic circuit 510, and then output as output data Data-Out.

Figure 7:
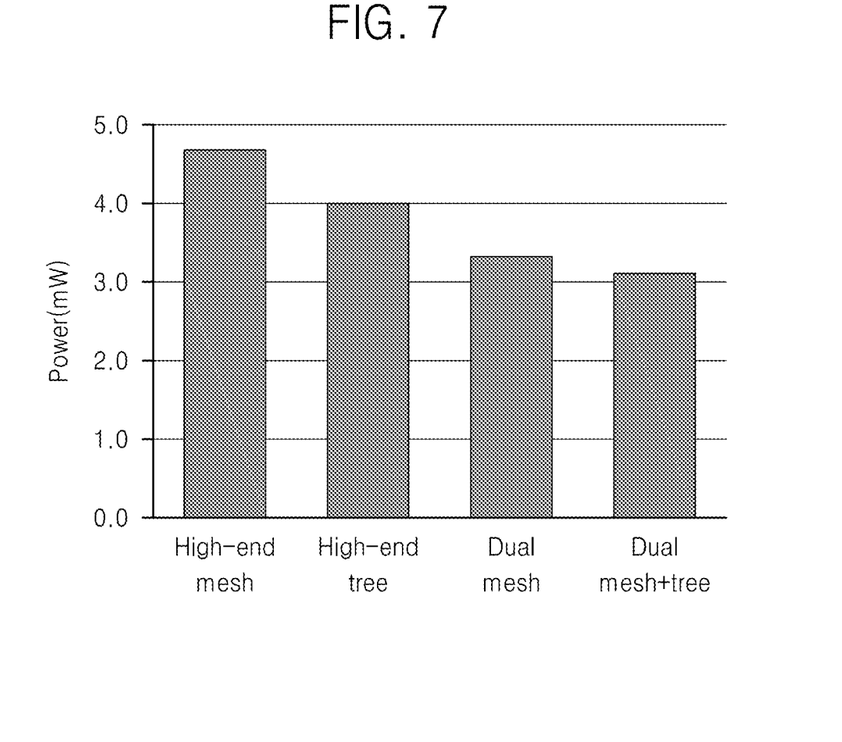
FIG. 7 is a graph showing the comparison of power consumption among semiconductor integrated circuits using the clock network illustrated in FIG. 1.

FIG. 7 is a graph showing a comparison of power consumption among semiconductor ICs, using the clock network illustrated in FIG. 1. Referring to FIG. 7, the power consumption is different, depending on the embodiments of the clock network. In other words, power consumption is reduced when a dual clock network (e.g., a dual mesh structure or a dual mesh-tree structure) including different clock networks selectively used according to a power mode is used, as compared to when a single high-end clock network (e.g., a mesh structure or a tree structure) is used, regardless of the power mode. As a result, power consumption is reduced in a DVFS environment, such that a lifespan of a battery is elongated. Further, the performance of a data processing device, including the semiconductor IC 1, is increased.

As described above, according to some embodiments, a different clock network is used, according to a power mode of a semiconductor IC. Therefore, the power consumption of the semiconductor IC is reduced. Since the power consumption of the semiconductor IC is reduced, power consumed in a data processing device, including the semiconductor IC, is also reduced.

While the exemplary embodiments have been particularly shown and described, it will be understood by those of ordinary skill in the art that various changes in forms and details may be made therein, without departing from the spirit and scope of the exemplary embodiments, as defined by the following claims.

What is claimed is:

1. A method of operating a semiconductor integrated circuit, the method comprising:
   dividing a clock signal into first output clock signals with a high frequency;
   dividing the clock signal into second output clock signals with a non-high frequency; and
   selecting and sinking one of the first output clock signals and the second output clock signals, according to a power mode,
   wherein the first output clock signals are generated by driving the clock signal to a first clock network configured in a mesh structure.

2. The method of claim 1, wherein the second output clock signals are generated by driving the clock signal to a second clock network configured in a mesh structure with less density than the mesh structure of the first clock network.

3. The method of claim 1, wherein the second output clock signals are generated by driving the clock signal to a second clock network configured in a tree structure with less density than the mesh structure of the first clock network.

4. The method of claim 1, wherein the power mode comprises a maximum performance mode and a non-maximum performance mode, the first output clock signals are selected and sunk in the maximum performance mode, and the second output clock signals are selected and sunk in the non-maximum performance mode.

5. A semiconductor integrated circuit comprising:
   a first clock network configured to divide a clock signal into first output clock signals with a high frequency;
   a second clock network configured to divide the clock signal into second output clock signals with a non-high frequency;
   a plurality of selection circuits configured to be connected between the first clock network and the second clock network, and configured to select and output one of the first output clock signals and the second output clock signals, according to a power mode; and
   a plurality of clock sinks configured to sink output clock signals respectively output from the selection circuits,
   wherein the first clock network is configured in a mesh structure, and the second clock network is configured in a mesh structure with less density than the mesh structure of the first clock network.

6. The semiconductor integrated circuit of claim 5, wherein each of the selection circuits is a NOR gate circuit configured to receive one of the first output clock signals and one of the second output clock signals, and one of the first clock network and the second clock network, which is not selected according to the power mode, is fixed to a ground voltage.

7. The semiconductor integrated circuit of claim 5, wherein each of the selection circuits is a NAND gate circuit configured to receive one of the first output clock signals and one of the second output clock signals, and one of the first clock network and the second clock network, which is not selected according to the power mode, is fixed to a supply voltage.

8. The semiconductor integrated circuit of claim 5, wherein each of the clock sinks is a flip-flop configured to output a data signal in response to the respective output clock signal output from a respective selection circuit.

9. The semiconductor integrated circuit of claim 5, further comprising a power mode detector configured to monitor the power mode of the semiconductor integrated circuit, and configured to output a selection signal, wherein each of the selection circuits is a multiplexer configured to output one of the first output clock signals and the second output clock signals, according to the selection signal.

10. The semiconductor integrated circuit of claim 5, wherein the first clock network and the second clock network are positioned on different layers.

11. The semiconductor integrated circuit of claim 5, wherein the first clock network and the second clock network are positioned on a same layer.

12. The semiconductor integrated circuit of claim 5, wherein the selection circuits select the first clock network when the power mode is a maximum performance mode, and select the second clock network when the power mode is a non-maximum performance mode.

13. A semiconductor integrated circuit comprising:
a first clock network configured in a mesh structure to generate first output clock signals;
a second clock network configured in a tree structure to generate second output clock signals;
a plurality of selection circuits configured to receive the first output clock signals and the second output clock signals, each of the selection circuits is configured to select and output one of the first output clock signals or one of the second output clock signals, according to a power mode; and
a plurality of clock sinks configured to receive the one of the first output clock signals or one of the second output clock signals from respective selection circuits, each of the clock sinks is configured to sink the one of the first output clocks signals or one of the second output signals output from a respective selection circuit,
wherein the plurality of selection circuits is further configured to be connected between the first clock network and the second clock network.

14. The semiconductor integrated circuit of claim 13, wherein the first output clock signals and the second output clock signals are generated from a common clock signal.

15. The semiconductor integrated circuit of claim 13, wherein the selection circuits select one of the first output clock signals when the power mode is a maximum performance mode, and selects one of the second output clock signals when the power mode is a non-maximum performance mode.

16. The semiconductor integrated circuit of claim 13, wherein each of the plurality of selection circuits is further configured as a NAND circuit, such that one of the first clock network and the second clock network, which is not selected by the selection circuits, is fixed to a supply voltage.

17. The semiconductor integrated circuit of claim 13, wherein each of the plurality of selection circuits is further configured as a NOR circuit, such that one of the first clock network and the second clock network, which is not selected by the selection circuits, is fixed to a ground voltage.

* * * * *